United States Patent
Ahnn et al.

(10) Patent No.: US 9,535,770 B2
(45) Date of Patent: Jan. 3, 2017

(54) ELECTRONIC SYSTEM WITH OFFLOADING MECHANISM AND METHOD OF OPERATION THEREOF

(71) Applicant: Samsung Electronics Co., Ltd., Suwon-si, Gyeonggi-Do (KR)

(72) Inventors: Jong Hoon Ahnn, San Jose, CA (US); Juhan Lee, Issaquah, WA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 195 days.

(21) Appl. No.: 14/210,994

(22) Filed: Mar. 14, 2014

(65) Prior Publication Data

US 2015/0261274 A1 Sep. 17, 2015

(51) Int. Cl.
*G06F 1/32* (2006.01)
*G06F 9/54* (2006.01)

(52) U.S. Cl.
CPC ............... *G06F 9/54* (2013.01); *G06F 1/329* (2013.01); *G06F 1/3212* (2013.01); *Y02B 60/1292* (2013.01); *Y02B 60/144* (2013.01)

(58) Field of Classification Search
CPC ....... G06F 1/3206; G06F 1/329; G06F 9/5094
USPC ........................................................ 713/300
See application file for complete search history.

(56) References Cited

U.S. PATENT DOCUMENTS

| | | | |
|---|---|---|---|
| 8,239,538 B2 | 8/2012 | Zhang et al. | |
| 9,026,814 B2 * | 5/2015 | Aasheim | G06F 1/3206 713/310 |
| 2008/0268828 A1 * | 10/2008 | Nagaraja | G06F 9/505 455/419 |
| 2008/0297662 A1 | 12/2008 | Gibbs | |
| 2009/0164772 A1 * | 6/2009 | Karkaria | G06F 9/445 713/100 |
| 2010/0131592 A1 * | 5/2010 | Zhang | G06F 9/5044 709/203 |
| 2012/0131137 A1 * | 5/2012 | Singh | H04L 67/2861 709/217 |
| 2012/0192191 A1 * | 7/2012 | Jellinek | G06F 9/5044 718/102 |
| 2012/0210325 A1 * | 8/2012 | de Lind van Wijngaarden | H04W 52/0258 718/103 |
| 2012/0222033 A1 * | 8/2012 | Byrum | G06F 9/5044 718/102 |
| 2012/0272077 A1 * | 10/2012 | Dow | G06F 1/1698 713/310 |
| 2013/0290755 A1 * | 10/2013 | Wolman | G06F 9/5094 713/320 |
| 2014/0045485 A1 * | 2/2014 | Jain | H04W 52/0261 455/420 |

(Continued)

FOREIGN PATENT DOCUMENTS

WO 2013038455 A1 3/2013

OTHER PUBLICATIONS

Adaptive Computation Offloading for Energy Conservation on Battery-Power Systems, Dec. 2007, Purdue University.

*Primary Examiner* — Vincent Tran
(74) *Attorney, Agent, or Firm* — IP Investment Law Group (57) ABSTRACT

An electronic system includes: a storage unit configured to store a usage profile; a control unit, coupled to the storage unit, configured to retrieve the usage profile for a profile period, prepare an application during the profile period, and determine a power level from the usage profile for executing or offloading the application during the profile period.

30 Claims, 6 Drawing Sheets (56) References Cited

U.S. PATENT DOCUMENTS

| | | | |
|---|---|---|---|
| 2014/0082697 A1* | 3/2014 | Watfa | H04W 76/025 726/3 |
| 2014/0095695 A1* | 4/2014 | Wang | G06F 9/5088 709/224 |
| 2014/0189389 A1* | 7/2014 | Lynar | G06F 1/329 713/320 |
| 2015/0046679 A1* | 2/2015 | Gathala | G06F 9/3885 712/30 |

* cited by examiner

ELECTRONIC SYSTEM WITH OFFLOADING MECHANISM AND METHOD OF OPERATION THEREOF

TECHNICAL FIELD

An embodiment of the present invention relates generally to an electronic system, and more particularly to a system for offloading.

BACKGROUND

Modern consumer and industrial electronics, especially devices such as graphical electronic systems, televisions, projectors, cellular phones, portable digital assistants, and combination devices, are providing increasing levels of functionality to support modern life including notebook computers, smartphones, and computer tablets.

Processing power, battery life, and memory can be limitations for some applications. Research and development in the existing technologies can take a myriad of different directions.

Thus, a need still remains for an electronic system with offloading mechanism to distribution execution of application to other devices. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system, including: a storage unit configured to store a usage profile; a control unit, coupled to the storage unit, configured to retrieve the usage profile for a profile period, prepare an application during the profile period, and determine a power level from the usage profile for executing or offloading the application during the profile period.

An embodiment of the present invention provides a method of operation of an electronic system including: generating a usage profile for a profile period; preparing an application during the profile period; and determining a power level from the usage profile for executing or offloading the application during the profile period.

An embodiment of the present invention provides a non-transitory computer readable medium including instructions for execution including: generating a usage profile for a profile period; preparing an application during the profile period; and determining a power level from the usage profile for executing or offloading the application during the profile period.

DETAILED DESCRIPTION

An embodiment of the present invention provides improved resource utilization for execution of applications or multiple applications. The electronic system can execute an application based on the location where it is most efficient. An embodiment of the present invention can execute at the source device or offload to the target device. The determination to execute or to offload can be based on factors, such as processing power, memory space, access to the appropriate resources by the target device, and execution time.

An embodiment of the present invention provides improved battery life for the source device. The electronic system can include the source device to offload the application to conserve its battery life or when the source device does insufficient battery life.

An embodiment of the present invention provides improved management of battery life to help determine if the source device should execute or offload the application. The usage profile provides activities for applications planned to be initiated at the source device during the profile period. The usage profile can also include the usage categories for power replenishment in addition to power consumption to help plan for an execution or offloading of the application based on not only the power level at the time the application is being prepared but also the power level for the remainder of the profile period.

An embodiment of the present invention provides an intelligent determination of execution or offloading of the application at or from the source device, respectively. The electronic system can provide the corrective actions to move power replenishment such that the source device has the power level to execute or offload the application. The electronic system can provide the corrective actions to reduce the power consumption or in speed up the charging during the power replenishment.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
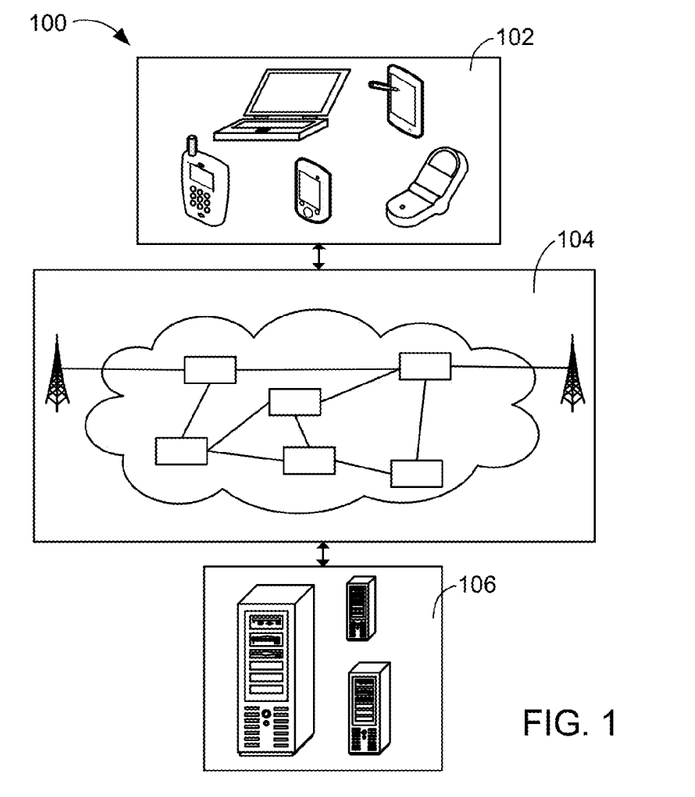
FIG. 1 is an electronic system with offloading mechanism in an embodiment of the present invention.

Referring now to FIG. 1, therein is shown an electronic system 100 with offloading mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, a notebook computer, a smartphone, a computer tablet, a media playback device, a Digital Video Disk (DVD) player, a three-dimension enabled DVD player, a recording device, such as a camera or video camera, or other multifunctional display or entertainment device. The first device 102 can couple, either directly or indirectly, to the communication path 104 to communicate with the second device 106 or can be a stand-alone device.

For illustrative purposes, the electronic system 100 is described with the first device 102 as a mobile device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set. In another example, the first device 102 can be a signal receiver for receiving broadcast or live stream signals, such as a television receiver, a cable box, a satellite dish receiver, or a web enabled device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
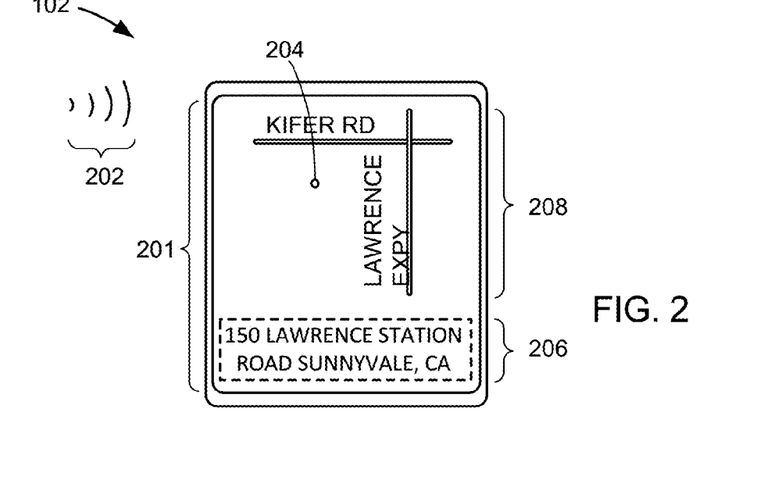
FIG. 2 is a screen shot of an example of an application operating with the electronic system.

Referring now to FIG. 2, therein is shown a screen shot of an example of an application 201 operating with the electronic system 100. The screen shot can represent the screen shot for the application 201 operating through the first device 102.

The screen shot depicts the application 201 operating in the electronic system 100 by receiving a spoken input 202, which can be a user's utterance. The spoken input 202 can invoke a number of applications or operations to perform on the first device 102, the second device 106 of FIG. 2, or a combination thereof. For example, the spoken input 202 can be used to invoke a single application, a number of different applications, a simple application, a complex application, or a combination thereof.

A simple application can be one example of the application 201 requiring processing power, memory, or a combination thereof that can be performed on the first device 102. A complex application can be one example of the application 201 requiring more processing power, memory, or a combination thereof than what can be performed by just the first device 102 without difficulties. Examples of these difficulties include battery life of the first device 102 or execution time such that the results of running the complex application would not be meaningful for its intended purpose because of execution time or conflicts with other applications running on the first device 102.

In the example depicted in FIG. 2, the spoken input 202 can include a user's desired location 204. In this example, the application 201 invoked by the spoken input 202 can be to location an address, such as "150 Lawrence Station Road Sunnyvale California".

The electronic system 100 can process the spoken input 202 to determine a location identifier 206, which can include a designation of the user's desired location 204. The screen shot depicts the location identifier 206 as "150 Lawrence Station Road Sunnyvale California". The screen shot also depicts the user's desired location 204 with a map 208.

For illustrative purposes, the electronic system 100 is described running the application 201 to find a geographic location based on the spoken input 202, although it is understood that the electronic system 100 can operate differently depending on the application 201 or applications invoked by the spoken input 202. For example, the spoken input 202 can invoke more complex functions such as large database search for point of interest, such as restaurants, availability of point of interest coinciding with availability of members of parties at a future date, verifying availability and routing information and time to reach the point of interest. These along with other functions can be complex depending on how extensive the operations are, the size of databases, and the computation complexity to handle a number of dynamic variables for the intended operation invoked by the spoken input 202. These functions can be performed by the application 201 as a single application, as a single application with different processes, different applications, or a combination thereof. These functions can be performed by the first device 102, the second device 106, or a combination thereof.

Figure 3:
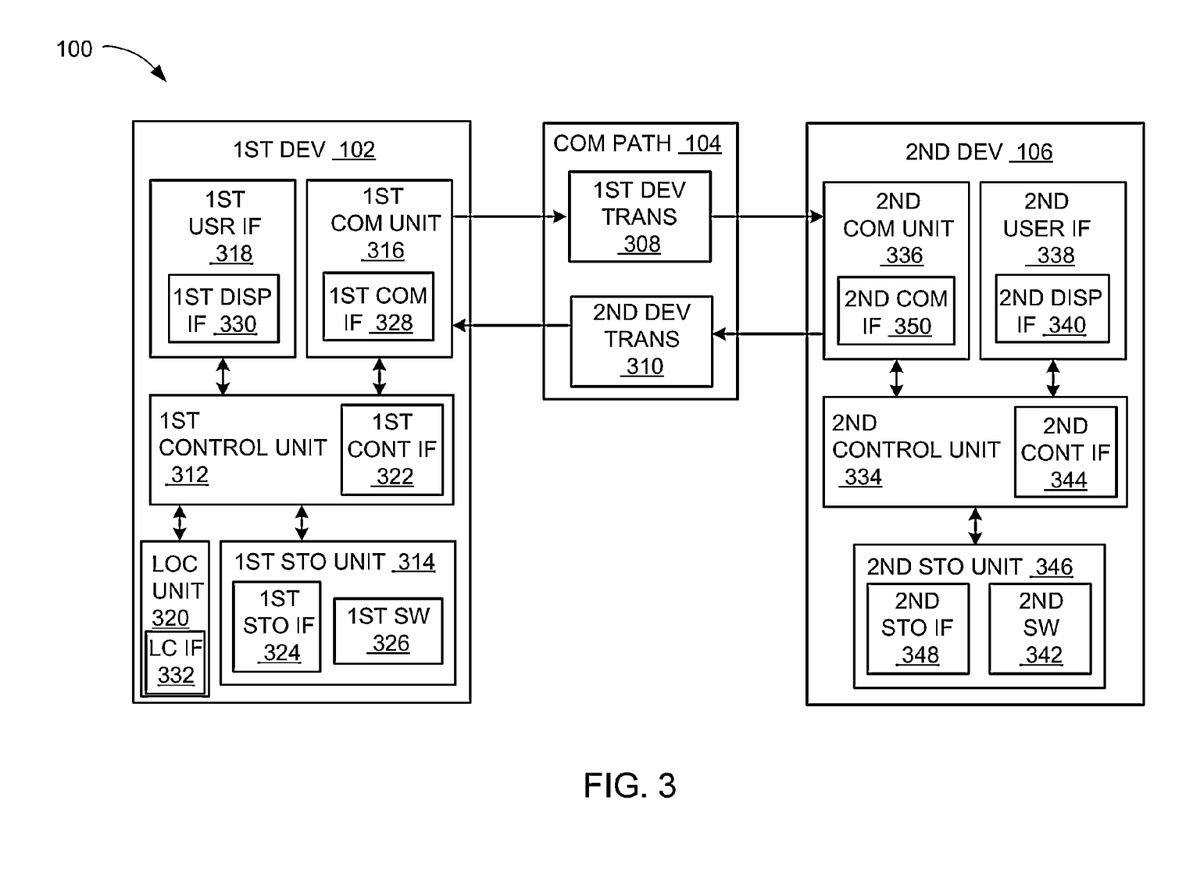
FIG. 3 is an exemplary block diagram of the electronic system.

Referring now to FIG. 3, therein is shown an exemplary block diagram of the electronic system 100. The electronic system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the electronic system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial computing system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104.

The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, a camera, or any combination thereof to provide data and communication inputs.

The first user interface 318 can include a first display interface 330. The first display interface 330 can include a display, a projector, a video screen, a speaker, a headset, or any combination thereof.

The first control unit 312 can operate the first user interface 318 to display information generated by the electronic system 100. The first control unit 312 can also execute the first software 326 for the other functions of the electronic system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera, or any combination thereof to provide data and communication inputs. Examples of the output device of the second user interface 338 can include a second display interface 340. The second display interface 340 can include a display, a projector, a video screen, a speaker, a headset, or any combination thereof.

The second control unit 334 can execute a second software 342 to provide the intelligence of the second device 106 of the electronic system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the electronic system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the electronic system 100 is shown with the second storage unit 346 as a single hierarchy storage system, although it is understood that the electronic system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The electronic system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 320, although it is understood that the second device 106 can also operate the location unit 320.

For illustrative purposes, the electronic system 100 is described by operation of the first device 102 and the second device 106. It is understood that the first device 102 and the second device 106 can operate any of the modules and functions of the electronic system 100.

Figure 4:
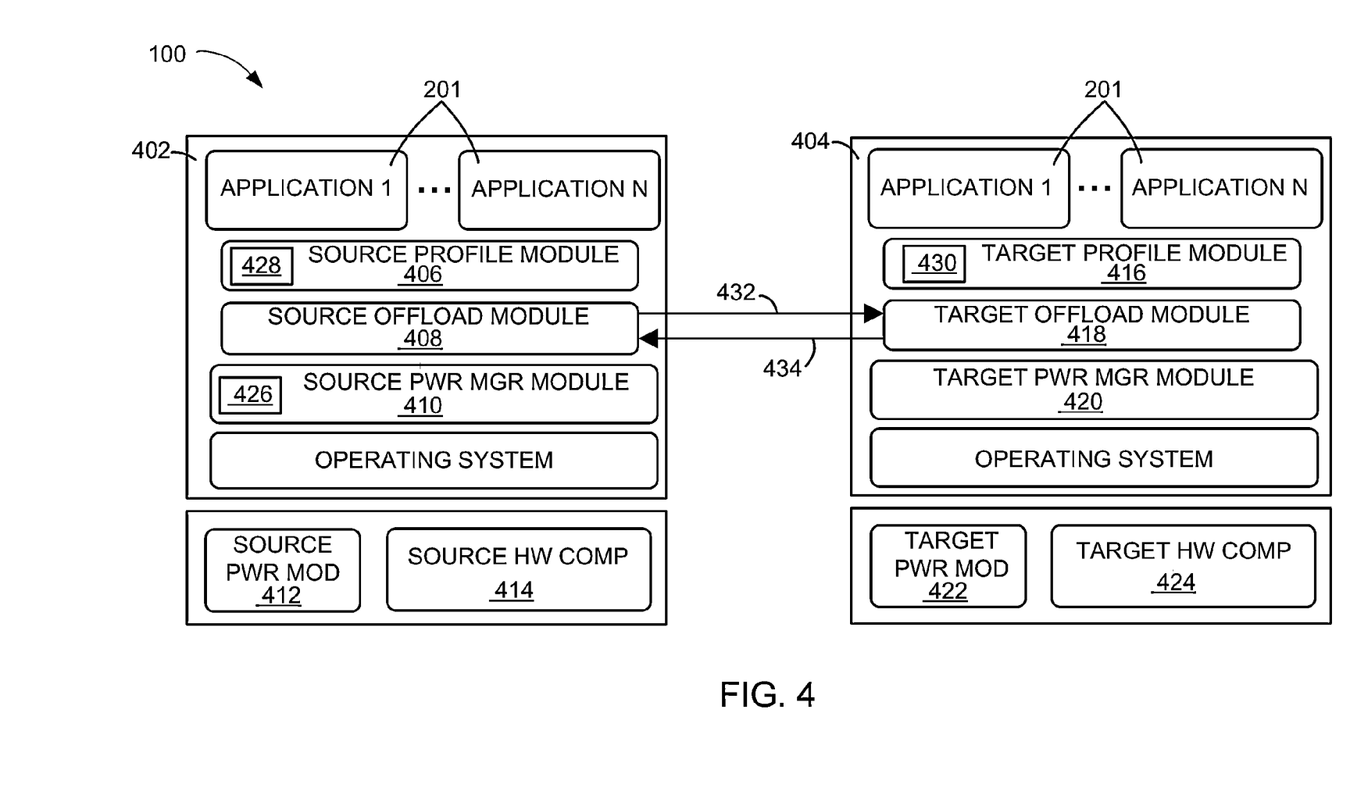
FIG. 4 is an example of an architecture view of the electronic system.

Referring now to FIG. 4, therein is shown an example of an architecture view of the electronic system 100. In this example, the architecture view depicts a mechanism for application offloading. As examples, the application offloading can for reduction of execution time, for efficiency of operation of the application 201 co-located with the database needed, for battery life, or a combination thereof.

As an example, the electronic system 100 can include a source device 402 and a target device 404. The source device 402 is the device that seeks to offload the application 201, a portion of the application 201, multiple applications, or a combination thereof. The target device 404 is the device that can possibly receive the application 201 sought to be offloaded from the source device 402.

As a more specific example, the application offloading can be from the source device 402, such as the first device 102 that is a battery operated device, to the target device 404, such as the second device 106 that is a device connected to a more sustained power source. A device connected to the sustained power source can be one plugged into an alternating current (AC) source, a larger battery source, or having a longer battery life. In this example, the source device 402 can be a mobile device and the target device 404 can be a server. Similarly, the source device 402 and the target device 404 can both be mobile devices as described as the first device 102.

The source device 402 can run or be capable of running the application 201 or a number of applications being different from the application 201, multiple instances of the application 201, or a combination thereof. The source device 402 can also include a source profile module 406, a source offload module 408, a source power manager module 410, a source power module 412, and source hardware components 414.

The target device 404 can run or be capable of running the application 201 or a number of applications being different from the application 201, multiple instances of the application 201, or a combination thereof. The target device 404 can also include a target profile module 416, a target offload module 418, a target power manager module 420, a target power module 422, and target hardware components 424. The target power module 422 can be optional in cases, for example, when the target device 404 is plugged in and has a virtually unlimited power compared to a battery of a mobile device.

The source power manager module 410 and the target power manager module 420 can monitor the power consumption, remaining power, or a combination thereof from the source power module 412 or the target power module 422, respectively. As a more specific example, the source power manager module 410, the target power manager module 420, or a combination thereof can be for battery power consumption or generally power consumption. The source power module 412 can include a battery. The target power module 422 can be a battery or a more sustainable power source. The source power manager module 410 and the target power manager module 420 can generate recommendations 426, such as warnings or status or alert, to the source offload module 408 or the target offload module 418 for its respective device.

The recommendations 426 can be used to determine whether or not the application 201 or a portion of the application 201 should be offloaded or eligible to be offloaded. The determination can be made, for example, with the amount of power, such as battery life, remaining in the source device 402, the target device 404, or a combination thereof not only for execution but also for transmission between the devices.

The source profile module 406 can generate a source energy profile 428 for each of the application 201 that can be executed by the source device 402. The source energy profile 428 can be generated before execution of the application 201. The source energy profile 428 provides power utilization needs for a particular application or a portion of the application 201 to run on the source device 402. The source energy profile 428 can also provide power utilization to transmit and receive the application 201 or a portion of the application 201 if offloading from the source device 402 occurred.

The target profile module 416 can generate a target energy profile 430 for each of the application 201 that can be executed by the target device 404. The target energy profile 430 can be generated before execution of the application 201. The target energy profile 430 provides power utilization needs for a particular application or a portion of the application 201 to run on the target device 404. The target energy profile 430 can also provide power utilization to transmit and receive the application 201 or a portion of the application 201 if offloading to the target device 404 occurred.

The source offload module 408 can utilize the source energy profile 428 for the application 201 along with the source power manager module 410 to help determine whether the application 201 should be offloaded. Similarly, the target offload module 418 can utilize the target energy profile 430 for the application 201 along with the target power manager module 420 to help determine whether to receive the offloading from the source device 402. The source offload module 408 and the target offload module 418 can make the determination for offloading before the execution of the application 201 or while the application 201 is being executed.

As an example where offloading is desired, the source device 402 can generate and send an offload request 432 to the target device 404. The target offload module 418 can launch the application 201 that has been requested as a process within the target device 404. The target device 404 can return an offloading response 434 back to the source device 402 when it is complete, when there is status, or a combination thereof.

The source hardware components 414, as an example, can collectively refer to the hardware units in the first device 102 described in FIG. 3. Similarly, the target hardware components 424, also as an example, can collectively refer to the hardware units in the second device 106 described in FIG. 3.

More details regarding the offloading process is described in the following figures.

Figure 5:
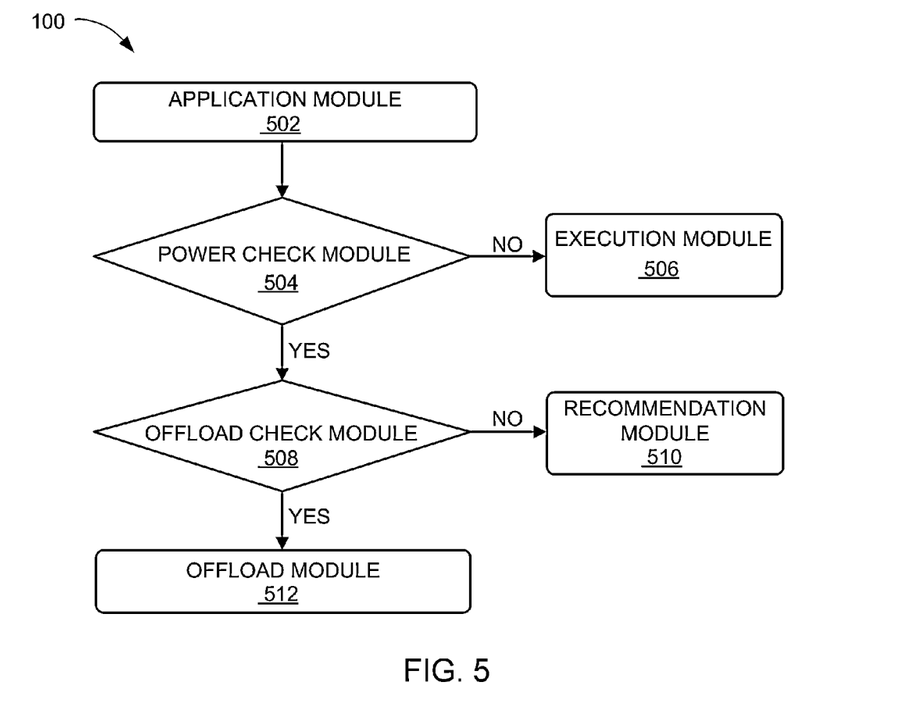
FIG. 5 is a control flow of the electronic system.

Referring now to FIG. 5, therein is shown a control flow of the electronic system 100. FIG. 5 depicts an example control flow for determining whether or not to perform an application offloading function. The control flow can include an application module 502, a power check module 504, an execution module 506, an offload check module 508, a recommendation module 510, and an offload module 512.

As an initial description, when the application 201 of FIG. 4 comes into the application module 502 in preparation for execution or continued execution, the source offload module 408 of FIG. 4 can retrieve the power or battery level upon the requested time from the source power manager module 410 of FIG. 4. The flow can progress from the application module 502 to the power check module 504.

The power check module 504 determines if the power or battery is sufficient to execute the application 201 being requested. If so, the source device 402 is suggested to run the application 201 and can be done so with the execution module 506. If not, the flow can progress from the power check module 504 to the offload check module 508.

The offload check module 508 determines whether conditions are met for the source device 402 to offload the application 201. The source offload module 408 can offload the application 201 or a portion of the application 201 to the target device 404 if the application 201 does not include components specific to the source device 402. Examples of components specific to the source device 402 can include mobile device specific application program interface (API) calls, such as global position system (GPS) API calls or other sensor related API calls, or functionalities not available or accessible to the target device 404. Such dependencies can be provided by the source profile module 406, the target profile module 416, or a combination thereof.

If offload check module 508 determines that the offloading conditions are satisfied, the flow can progress from the offload check module 508 to the offload module 512. The offload module 512 can invoke operation of the source offload module 408 to generate the offload request 432 of FIG. 4 to the target device 404. If the target device 404 accepts the offload request 432, the target device 404 can launch the application 201 corresponding to the offload request 432 as its process.

If the offload check module 508 determines that the offloading conditions are not satisfied, the flow can progress to the recommendation module 510. The recommendation module 510 recommends that the source device 402, the target device 404, or a combination thereof not execute the application 201. The recommendation module 510 can provide other recommendations 426 of FIG. 4 to possibly lead to a condition that can enable the execution or offloading of the application 201. This will be described more in the following figures.

Figure 6:
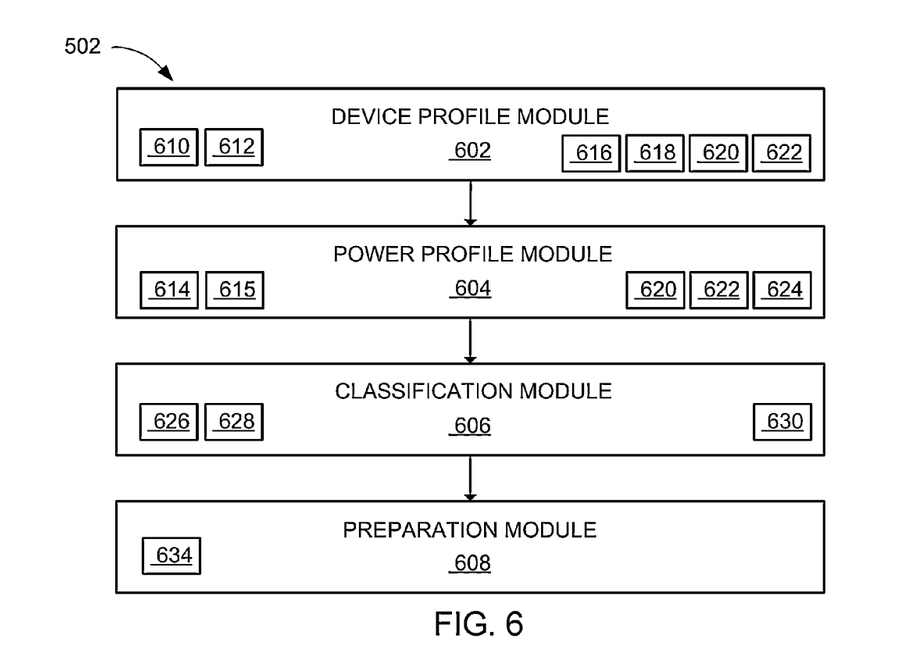
FIG. 6 is a control flow of the application module.

Referring now to FIG. 6, therein is shown a control flow of the application module 502. The application module 502 can include a device profile module 602, the power profile module 604, a classification module 606, and a preparation module 608.

The device profile module 602 generates a usage profile 610 for the source device 402. The device profile module 602 can utilize the source energy profile 428 of FIG. 4 for each of the application 201. The usage profile 610 represents a typical usage of the source device 402 during a profile period 612. The profile period 612 can be based on time 614, such an hour, a day, a week, or a month. The profile period 612 can be based on a context 616, such as working hours, meeting times, class time, off-hours, or vacation time. The context 616 refers types of activities for a chronology period.

The usage profile 610 can also include usage categories 618. The usage categories 618 can be labeled during the profile period 612. The usage categories 618 represents the type of activities. The usage categories 618 can be based on power consumption 620 or power replenishment 622.

The activities classified as power consumption 620 involve net power or net battery usage or drain operating on a device. Examples of activities that net consumes power include when an application executes, operation of the source device 402 during talk time or stand-by time, operations involving display or in background without involving the display.

The activities classified as power replenishment 622 involve net power or net battery charge gain or addition. Examples of these activities include any form of charging where the charging amount is greater than the utilization of power by the source device 402 during charging.

The usage profile 610 includes an activity time 615 for each activity occurrence throughout the profile period 612. The activity time 615 can represent a time duration for a completed execution or operation of the application 201 or a portion of the application 201. The flow can progress from the device profile module 602 to the power profile module 604.

The usage profile 610 can be stored in the first storage unit 314 of FIG. 3, the second storage unit 346 of FIG. 3, or a combination thereof. The usage profile 610 can be read or retrieved from these memories as well by the first control unit 312 of FIG. 3, the second control unit 334 of FIG. 3, or a combination thereof.

The power profile module 604 determines a power level 624 of based on the usage profile 610. The power level 624 represent the energy level for the device to execute an operation, such as executing the application 201. An example of the power level 624 is the amount of charge remaining in a battery. The power level 624 can be determined based on an estimated power remaining in the source device 402, for example, based on the anticipated operation of the source device 402 and based on operations on the source device 402 per the usage profile 610.

The power level 624 can vary throughout the profile period 612 based on activities on the source device 402 and based on the usage categories 618 throughout the profile period 612. For example, the power level 624 can decrease as the activities are consuming power or classified as power consumption 620.

Continuing with the example, the power level 624 can increase as the activities on the source device 402 include charging the source device 402 such that those activities are deemed as power replenishment 622. The power level 624 can provide remaining power amount in an instant of time 614 or per the context 616 in the usage profile 610 as well as can provide an aggregate or cumulative power amount from the beginning to the end of the profile period 612 to provide a quick and simple reading of expected execution or offloading possibilities.

The power profile module 604 can operate with the source profile module 406 of FIG. 4 to generate the power level 624 for the usage profile 610 for the source device 402. As described in FIG. 4, the source profile module 406 can generate the source energy profile 428 of FIG. 4 for the application 201 in the usage profile 610. The power level 624 can incorporate the source energy profile 428 based on when the application 201 can be operating during the profile period 612. The flow can progress from the power profile module 604 to the classification module 606.

The classification module 606 generates a classification 626 for particular activities to be offload 628 or non-offload 630. The classification 626 refers to a determination for the offload 628 or the non-offload 630 before the application 201 comes up for execution. The offload 628 as the classification 626 refers to a plan to offload the execution of the application 201 from the source device 402. The non-offload 630 as the classification 626 refers to a plan to execute the application 201 on the source device 402 or not to offload but not necessary execute on the source device 402.

As example, the classification module 606 can generate the classification 626 based on the power level 624 and when a particular activity is expected to execute per the usage profile 610 during the profile period 612. As a more specific example, if the application 201 is expected to be executed per the usage profile 610 and being executed on the source device 402 with the power level 624 and at the activity time 615 as expected, then the application 201 can be pre-classified with the classification 626 as non-offload 630. If a particular application is not one of the application 201 expected to execute within the profile period 612, not included in the usage profile 610, the power consumption 620 can exceed what is available at the time indicated by the power level 624, or a combination thereof, then that particular application can be pre-classified with the classification 626 as offload 628. The flow can progress from the classification module 606 to the preparation module 608.

The preparation module 608 stages applications or a portion of applications for execution on a device or for off-loading. The preparation module 608 can stage the application 201 that is expected as part of the usage profile 610 during the profile period 612 and at the activity time 615 as expected within the profile period 612. The preparation module 608 can also stage the application 201 that is not part of the usage profile 610 or not at the activity time 615 as expected within the profile period 612.

The preparation module 608 can stage the application 201 for execution on the source device 402 or for offloading in a queue 634. The queue 634 provides a staging mechanism where one end of the queue 634 has the highest priority to be analyzed for execution or offloading while the opposite end can be the last priority for execution or offloading. The application 201 or a portion of the application 201 can be reordered to increase or decrease the priority. The application 201 can be initially placed anywhere in the queue 634 when first received by the preparation module 608.

Figure 7:
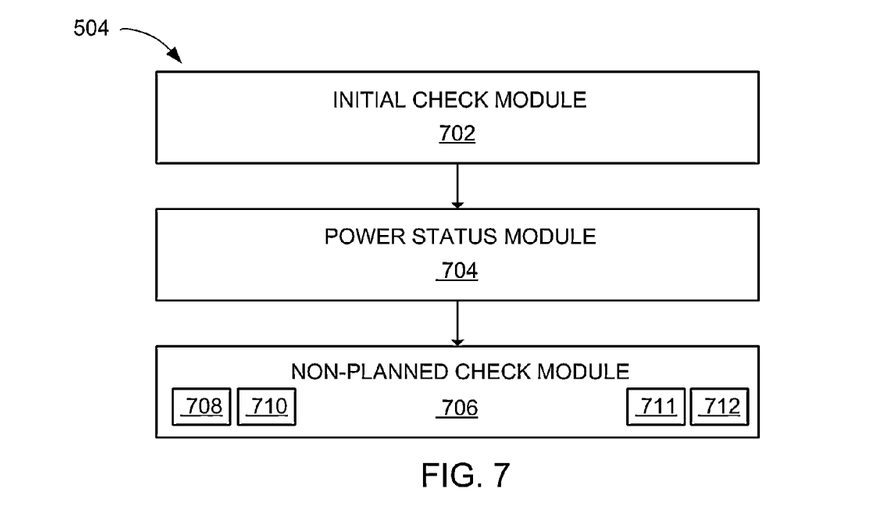
FIG. 7 is a control flow of the power check module.

Referring now to FIG. 7, therein is shown a control flow of the power check module 504. The power check module 504 determines if there is enough power to execute the application 201 next in line in the queue 634 of FIG. 6 from the preparation module 608 of FIG. 6. The power check module 504 can include an initial check module 702, a power status module 704, and a non-planned check module 706.

The initial check module 702 checks the classification 626 for the application 201 as non-offload 630 or offload 628. The initial check module 702 also checks if the application 201 does not have the classification 626 pre-classified or previously classified, or is not part of the usage profile 610 of FIG. 6.

If the classification 626 is non-offload 630, then the flow can progress to the power status module 704. If the classification 626 is offload 628 then the flow can progress to the offload check module 508 of FIG. 5. If the application 201 does not have a value for the classification 626, then the flow can progress to the non-planned check module 706.

The power status module 704 determines if the power level 624 of the source device 402 of FIG. 4 is sufficient to execute the application 201. If the power level 624 is enough, then the power status module 704 determines if the application 201 falls within the usage profile 610 at the activity time 615 as estimated for execution. If so, the flow can progress to the execution module 506 of FIG. 4. The power status module 704 also determines if the application 201 is not within the usage profile 610 or at the activity time 615 different than the estimated point in the usage profile 610, then the flow can progress to the non-planned check module 706.

If power level 624 is not enough, then flow can progress to the offload check module 508 regardless of the classification 626. The power status module 704 can also reclassify the application 201 to be offload 628.

The non-planned check module 706 determines if the application 201 not falling in line with the usage profile 610 can be executed or offloaded. The non-planned check module 706 can make this determination in a number of ways. For example, the non-planned check module 706 can generate a plan status 708 by determining if the application 201 can be offloaded or not or can run by checking future activities during the profile period 612 for the usage profile 610. The plan status 708 refers to expected value or profile for the power level 624 for the rest of the profile period 612 in the usage profile 610.

The plan status 708 can include an offloadable status 710, non-offloadable status 711, or an executable status 712. The offloadable status 710 indicates that the power level 624 is enough for the source device 402 to offload the application 201. The non-offloadable status 711 indicates that the power level 624 is not enough for the source device 402 to offload the application 201. The executable status 712 indicates that the application 201 can be actually executed on the source device 402. The executable status 712 can also result in the application 201 being classified as non-offload 630, regardless of whether the application 201 was pre-classified or not, or if the classification 626 is changed.

For illustrative purposes, the non-planned check module 706 is described generating three potential future status of the power level 624 and its sufficiency for particular operation for the remainder of the profile period 612, although it is understood that the non-planned check module 706 can operate differently. For example, the non-planned check module 706 can generate one status for both offload 628 and non-offload 630 with one status notification or flag where one value represents one while the other value represents the other.

There are a number of ways the non-planned check module 706 can generate the plan status 708. For example, the non-planned check module 706 can scan the remainder of the profile period 612 and identify the usage categories 618 in the usage profile 610 starting from the current point in the profile period 612. Depending on whether the usage profile 610 based on time 614 or context 616, the non-planned check module 706 can look forward into the future or the remainder of the profile period 612 to assess the usage categories 618.

If there are activities in the usage categories 618 classified as power replenishment 622, the non-planned check module 706 can analyze each of these activities regarding how long the power or battery is being charged and the amount of charge is gained or replenished. The analysis can be done until the next instance for power replenishment 622 or can be done for all instances for power replenishment 622 for the remainder of the profile period 612.

Based on the needs of the application 201 and the power level 624 for the rest of the profile period, the non-planned check module 706 can generate the appropriate plan status 708. If the power level 624 indicates that there is enough power to offload, then the offloadable status 710 can be generated. If the power level 624 indicates that there is not enough power to offload, then the non-offloadable status 711 is generated. Also, if the power level 624 indicates there is enough power to execute the application 201 on the source device 402, then the executable status 712 is generated.

The non-planned check module 706 can generate one status for the plan status 708 or it can generate multiple statuses. For example, the executable status 712 can be generated along with the offloadable status 710 or the non-offloadable status 711. The non-planned check module 706 can also change the plan status 708 based on activities that occur during the profile period 612, such as changes to the time or duration or sequence of activities in the usage profile 610 or unexpected applications sought to be executed on the source device 402 or to be offloaded.

As another example, the non-planned check module 706 can also generate the plan status 708 with a simple aggregate check of the power level 624 to the next instance for power replenishment or the total aggregate remaining for the profile period 612. As described earlier, the appropriate status for the plan status 708 can be generated depending upon the power level 624.

If the plan status 708 is the executable status 712, then the flow can progress to the execution module 506. If the plan status 708 is other than then executable status 712, then the flow can progress to the recommendation module 510.

Figure 8:
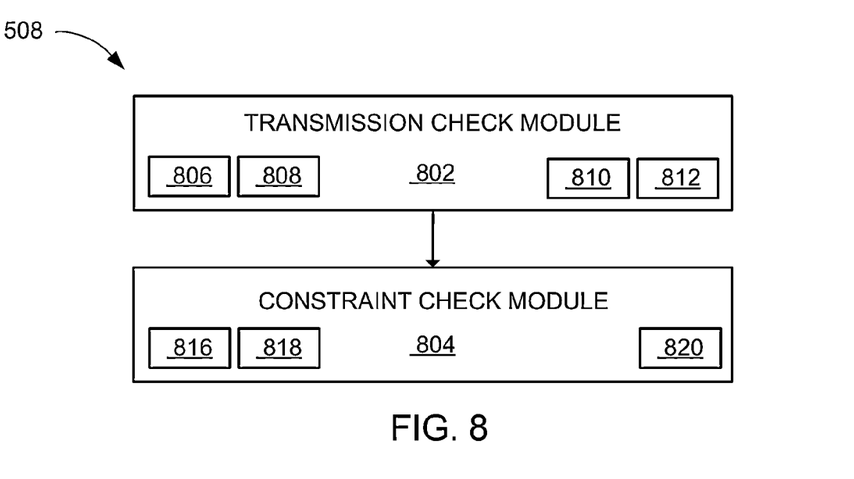
FIG. 8 is a control flow of the offload check module.

Referring now to FIG. 8, therein is shown a control flow of the offload check module 508. The offload check module 508 can include a transmission check module 802 and a constraint check module 804.

The transmission check module 802 determines if the source device 402 has enough power to offload an application. The transmission check module 802 generates an offload transmission status 806 to indicate whether or not the power level 624 is sufficient in the source device 402 to transmit the application 201 to the target device 404, receive the results from the target device 404, intermediate updates for the application 201 that has been offloaded, or a combination thereof.

The offload transmission status 806 can include an initiation status 808, a result status 810, and a progress status 812. The initiation status 808 indicates the sufficiency of the power level 624 to transmit the application 201 for offloading from the source device 402. The result status 810 indicates the sufficiency of the power level 624 through the completion of the application 201 being offloaded and returning the final results for that execution back from to the source device 402. The progress status 812 indicates the sufficiency of the power level 624 for the source device 402 to receive at least some response after the initial offloading of the application 201.

The result status 810 can indicate the power level 624 that are reflected in the initiation status 808 and the progress status 812. The progress status 812 can also be the result status 810 as in examples where there are no intermediate updates after the initial offloading of the application 201.

If the offload transmission status 806, or as a more specific example the result status 810, indicates that the power level 624 is sufficient to complete the application 201 by offloading from the source device 402, then the flow can progress to the constraint check module 804. As a further example, the initiation status 808 indicating that the power level 624 is sufficient to complete the transmission of the application 201 to offload from the source device 402, the flow can also progress to the constraint check module 804. In this example, the results from the application 201 executed on the target device 404 can be received by the source device 402 during the power replenishment 622.

If the offload transmission status 806, or as a more specific example the result status 810, indicates that the power level 624 is not sufficient to complete the application 201 by offloading from the source device 402, then the flow can progress to the recommendation module 510. As a further example, the initiation status 808 indicating that the power level 624 is not sufficient to complete the transmission of the application 201 to offload from the source device 402, the flow can also progress to the recommendation module 510.

The constraint check module 804 determines that the resources will support the offloading of the application 201 or the portion of the application 201. The constraint check module 804 also verifies the target device 404 can execute the application 201. The constraint check module 804 can make the determination in a number a ways and from a number of viewpoints. For example, the constraint check module 804 verifies that the source device 402 can offload the application 201, the target device 404 can receive the application 201, and the compatibility of the application 201 with the target device 404.

Regarding the source device 402, in addition to the power level 624, the constraint check module 804 verifies that there are no other source constraints 816 to prevent the source device 402 from offloading the application 201. Examples of the source constraints 816 can include functionality of the transmit and receive circuits in the source device 402, availability of the application 201 or information related to the application 201 to be offloaded, the availability of the source device 402 to receive the results after the execution of the application 201 back from the target device 404, and processing and memory in the source device 402.

Regarding the target device 404, target constraints 818 include hardware specific API calls not available to the target device 404 as an example described earlier. Similar to the source constraints 816, the constraint check module 804 verifies that there are no other target constraints 818 as restrictions or capability in or related to the target device 404 that would prevent the application 201 from receiving the application 201, from executing the application 201, or from sending the results of executing the application 201 back to the source device 402. Another example of the target constraints 818 can be authorization or privilege to access the necessary database or information to execute the application 201. Access can also include access to the appropriate software modules or libraries or functions in addition to specific hardware components, such as the hardware units of FIG. 3.

There are a number of factors that can be contribute to the source constraints 816, the target constraints 818, or a combination thereof. For example, the source device 402 and the target device 404 must have some level of compatibility 820. The compatibility 820 refers to interoperability between the source device 402 and the target device 404 such that communication can occur between these devices as well as functional compatibility to allow the offloading and executing of the application 201 between these devices. The compatibility 820 is not limited to solely direct communication between the source device 402 and the target device 404 where there can be other devices as part of the communication path 104 of FIG. 1 between these devices.

Examples for the compatibility 820 can include hardware resources, software resources, and operating systems. Examples of the hardware resources are the hardware units as described in FIG. 3. Examples of the software resources can also be found in FIG. 3 with further clarification can include the application 201 available to both the source device 402 and the target device 404. The compatibility 820 can also include versions of hardware, software, or a combination thereof between the source device 402 and the target device 404.

Figure 9:
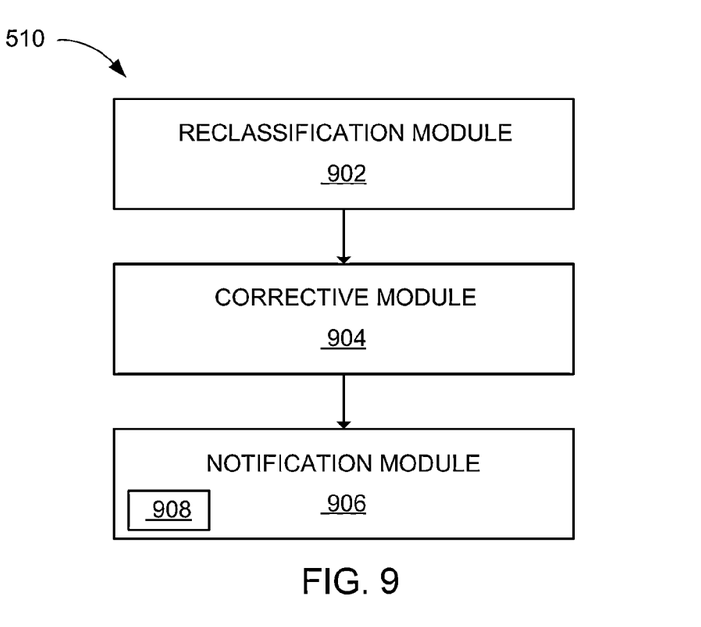
FIG. 9 is a control flow of the recommendation module.

Referring now to FIG. 9, therein is shown a control flow of the recommendation module 510. The recommendation module 510 provide the recommendations 426 if the initial assessment does not allow the source device 402 of FIG. 4 to execute the application 201 or not allow the source device 402 to offload the application 201. One of the recommendations 426 can include not to execute the application 201 at the source device 402 or at the target device 404. The recommendation module 510 can include a reclassification module 902, a corrective module 904, and a notification module 906.

The reclassification module 902 determines if the classification 626 of FIG. 6 for the application 201 needs to be changed. In one example, if the application 201 targeted to be executed from the preparation module 608 of FIG. 6 occurs at the activity time 615 of FIG. 6 different than expected in the profile period 612 of FIG. 6 for the usage profile 610 of FIG. 6 and the plan status 708 of FIG. 7 indicates the non-offloadable status 711, then the classification 626 can be modified from the offload 628 to the non-offload 630. However, if the recommendation module 510 can provide corrective actions, the classification 626 can remain as offload 628 or can be executed on the source device 402 if the power level 624 enables the operation. The flow can progress from the reclassification module 902 to the corrective module 904.

The corrective module 904 determines if there are other corrective actions 908 that can be taken to execute the application 201 on the source device 402 or to be able to offload from the source device 402. The corrective actions 908 are possible actions that can be performed in the source device 402 enabling the application 201 to be executed on the source device 402 or to be offloaded from the source device 402. If the corrective actions 908 exist, then those will be used to generate the recommendations 426.

As an example, if the power level 624 of FIG. 6 is not sufficient for the remainder of the profile period 612, the corrective module 904 can search the usage profile 610 for activities that have the usage categories 618 as power replenishment 622. If found and the power level 624 is still deemed not sufficient to execute or offload the application 201, the corrective module 904 can generate the recommendations 426 to maximize charging or replenishment of the power source or the battery.

For example, the recommendations 426 to the source device 402 can include overriding device settings to a lower power consumption mode such that the charging and replenishment can be faster and more. The recommendations 426 can include operating the transceiver in the source device 402 to be in receive only mode since the transmit can take up more power, turn off display screen immediately, or pause noncritical circuits or applications running on the source device 402.

As a further example, if the corrective module 904 cannot find activities for power replenishment 622, the corrective module 904 can generate as part of the recommendations 426 for the source device 402 to include activities for the power replenishment 622 in the future. The corrective module 904 can also generate recommendations 426 to move the activities that are for power replenishment 622 up closer to the present time if found later in the profile period 612. Further, the corrective module 904 can also reduce power drain or consumption by generating the recommendations 426 for the lower power consumption mode as described earlier.

If the corrective module 904 cannot find the appropriate corrective actions 908 for the recommendations 426 or the recommendations 426 cannot be carried out, then the corrective module 904 can generate the recommendations 426 to include pausing the execution or offloading the application 201. The recommendations 426 can also include re-queuing the application 201 in the application module 502 of FIG. 5 for execution or offloading at a later time.

The recommendation module 510 can provide the recommendations 426 to update the usage profile 610 for the profile period 612, current or future. The recommendations 426 can include notifications to the user of the source device 402 and the electronic system 100.

It has been discovered that the electronic system 100 provides improved resource utilization for execution of applications or multiple applications. The electronic system 100 can execute an application 201 based on the location where it is most efficient. An embodiment of the present invention can execute at the source device 402 or offload to the target device 404. The determination to execute or to offload can be based on factors, such as processing power, memory space, access to the appropriate resources by the target device 404, and execution time.

It has been further discovered that the electronic system 100 provides improved battery life for the source device 402. The electronic system 100 can include the source device 402 to offload the application 201 to conserve its battery life or when the source device 402 does insufficient battery life.

It has been yet further discovered that the electronic system 100 provides improved management of battery life to help determine if the source device 402 should execute or offload the application 201. The usage profile 610 provides activities for applications planned to be initiated at the source device 402 during the profile period 612. The usage profile 610 can also include the usage categories 618 for power replenishment 622 in addition to power consumption 620 to help plan for an execution or offloading of the application 201 based on not only the power level 624 at the time the application 201 is being prepared but also the power level 624 for the remainder of the profile period 612.

It has been yet further discovered that the electronic system 100 provides an intelligent determination of execution or offloading of the application 201 at or from the source device 402, respectively. The electronic system 100 can provide the corrective actions 908 to move power replenishment 622 such that the source device 402 has the power level 624 to execute or offload the application 201. The electronic system 100 can provide the corrective actions 908 to reduce the power consumption 620 or in speed up the charging during the power replenishment 622.

The electronic system 100 has been described with module functions or order as an example. The electronic system 100 can partition the modules differently or order the modules differently. For example, the modules can be combined or iterate differently. For example, the classification module 606 can be optional. The recommendation module 510 can make more than the recommendations 426 and can invoke the appropriate actions based on the corrective actions 908 in the recommendations 426.

The modules described in this application can be hardware implementation or hardware accelerators in the first control unit 312 of FIG. 3 or in the second control unit 338 of FIG. 3. The modules can also be hardware implementation or hardware accelerators within the first device 102 or the second device 106 but outside of the first control unit 312 or the second control unit 338, respectively, as depicted in FIG. 3. However, it is understood that the first control unit 312, the second control unit 338, or a combination thereof can collectively refer to all hardware accelerators for the modules.

The modules described in this application can be implemented as instructions stored on a non-transitory computer readable medium to be executed by a first control unit 312, the second control unit 334, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

A further embodiment of the present invention include a method of operation of an electronic system 100 in. The method includes: generating a usage profile for a profile period; preparing an application during the profile period; and determining a power level from the usage profile for executing or offloading the application during the profile period.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a storage unit configured to store a usage profile;
a control unit, coupled to the storage unit, configured to:
generate a classification representing an offload or a non-offload dynamically based on a change in a power level remaining,
check whether an application is pre-classified as the classification representing the offload or the non-offload,
retrieve the usage profile for a profile period,
prepare the application during the profile period, and
determine the power level from the usage profile for executing or offloading the application according to the classification during the profile period.

2. The system as claimed in claim 1 wherein the control unit is configured to:

determine the power level for offloading to a target device; and
verify the target device to be able to execute the application.

3. The system as claimed in claim 1 wherein the control unit is configured to:
retrieve the usage profile with the application at an activity time; and
prepare the application at the activity time for executing at a source device.

4. The system as claimed in claim 1 wherein the control unit is configured to:
generate the usage profile with a power replenishment;
generate the usage profile without the application during the profile period; and
execute the application due to the power replenishment.

5. The system as claimed in claim 1 wherein the control unit is configured to:
generate the usage profile with the application at an activity time;
prepare the application during the profile period differently than at the activity time; and
determine a corrective action to execute or offload the application according to the classification.

6. The system as claimed in claim 1 wherein the control unit is configured to determine a corrective action to execute or offload the application and the corrective action includes recommending to move an activity representing a power replenishment in the profile period to an earlier instance of a time.

7. The system as claimed in claim 1 wherein the control unit is configured to:
determine the power level insufficient to execute or to offload the application;
determine a corrective action to pause the application.

8. The system as claimed in claim 1 wherein the control unit is configured to:
determine the power level insufficient to execute or to offload the application;
determine a corrective actions to re-queue the application to execute or offload at a later time.

9. The system as claimed in claim 1 wherein the control unit is configured to:
determine the power level insufficient to execute or to offload the application;
determine a corrective actions including a recommendation to move an activity representing a power replenishment to an earlier instance of a time.

10. The system as claimed in claim 1 wherein the control unit is configured to retrieve the usage profile based on a context.

11. A method of operation of an electronic system comprising:
generating a classification representing an offload or a non-offload dynamically based on a change in a power level remaining;
checking whether an application is pre-classified as the classification representing the offload or the non-offload;
generating a usage profile for a profile period;
preparing the application during the profile period; and
determining the power level from the usage profile with a control unit for executing or offloading the application according to the classification during the profile period.

12. The method as claimed in claim 11 wherein:
determining the power level includes determining the power level for offloading to a target device; and further comprising:
verifying the target device to be able to execute the application.

13. The method as claimed in claim 11 wherein:
generating the usage profile includes generating the usage profile with the application at an activity time; and
preparing the application includes preparing the application at the activity time for executing at a source device.

14. The method as claimed in claim 11 wherein:
generating the usage profile includes:
generating the usage profile with a power replenishment,
generating the usage profile without the application during the profile period; and
further comprising:
executing the application due to the power replenishment.

15. The method as claimed in claim 11 wherein:
generating the usage profile includes generating the usage profile with the application at an activity time;
preparing the application include preparing the application during the profile period differently than at the activity time; and
further comprising:
determining a corrective action to execute or offload the application.

16. The method as claimed in claim 11 further comprising:
determining a corrective action to execute or offload the application; and
wherein:
determining the corrective action includes recommending to move an activity representing a power replenishment in the profile period to an earlier instance of a time.

17. The method as claimed in claim 11 wherein:
determining the power level from the usage profile for executing or offloading the application include determining the power level insufficient to execute or to offload the application;
further comprising:
determining a corrective action pause the application.

18. The method as claimed in claim 11 wherein:
determining the power level from the usage profile for executing or offloading the application include determining the power level insufficient to execute or to offload the application;
further comprising:
determining a corrective actions to re-queue the application to execute or offload at a later time.

19. The method as claimed in claim 11 wherein:
determining the power level from the usage profile for executing or offloading the application include determining the power level insufficient to execute or to offload the application;
further comprising:
determining a corrective actions including a recommendation to move an activity representing a power replenishment to an earlier instance of a time.

20. The method as claimed in claim 11 wherein generating the usage profile includes generating the usage profile based on a context.

21. A non-transitory computer readable medium including instructions for execution comprising:
generate a classification representing an offload or a non-offload dynamically based on a change in a power level remaining;

checking whether an application is pre-classified as the classification representing the offload or the non-offload;
generating a usage profile for a profile period;
preparing an application during the profile period; and
determining the power level from the usage profile for executing or offloading the application according to the classification during the profile period.

22. The non-transitory computer readable medium as claimed in claim 21 wherein:
determining the power level includes determining the power level for offloading to a target device; and
further comprising:
verifying the target device to be able to execute the application.

23. The non-transitory computer readable medium as claimed in claim 21 wherein:
generating the usage profile includes generating the usage profile with the application at an activity time; and
preparing the application includes preparing the application at the activity time for executing at a source device.

24. The non-transitory computer readable medium as claimed in claim 21 wherein:
generating the usage profile includes:
generating the usage profile with a power replenishment,
generating the usage profile without the application during the profile period; and
further comprising:
executing the application due to the power replenishment.

25. The non-transitory computer readable medium as claimed in claim 21 wherein:
generating the usage profile includes generating the usage profile with the application at an activity time;
preparing the application include preparing the application during the profile period differently than at the activity time; and
further comprising:
determining a corrective action to execute or offload the application.

26. The non-transitory computer readable medium as claimed in claim 21 further comprising:
determining a corrective action to execute or offload the application; and
wherein:
determining the corrective action includes moving an activity representing a power replenishment in the profile period to an earlier instance of a time.

27. The non-transitory computer readable medium as claimed in claim 21 wherein:
determining the power level from the usage profile for executing or offloading the application include determining the power level insufficient to execute or to offload the application;
further comprising:
determining a corrective action pause the application.

28. The non-transitory computer readable medium as claimed in claim 21 wherein:
determining the power level from the usage profile for executing or offloading the application include determining the power level insufficient to execute or to offload the application;
further comprising:
determining a corrective actions to re-queue the application to execute or offload at a later time.

29. The non-transitory computer readable medium as claimed in claim 21 wherein:
determining the power level from the usage profile for executing or offloading the application include determining the power level insufficient to execute or to offload the application;
further comprising:
determining a corrective actions including a recommendation to move an activity representing a power replenishment to an earlier instance of a time.

30. The non-transitory computer readable medium as claimed in claim 21 wherein generating the usage profile includes generating the usage profile based on a context.

* * * * *